United States Patent
Kaltenrieder et al.

(10) Patent No.: US 11,169,488 B2
(45) Date of Patent: Nov. 9, 2021

(54) WATER-RESISTANT WATCH CASE

(71) Applicant: Omega SA, Biel/Bienne (CH)

(72) Inventors: Cedric Kaltenrieder, Courtelary (CH); Gregory Kissling, La Neuveville (CH); Yves Winkler, Schmitten (CH); John Ramsay, Maevy (GB)

(73) Assignee: Omega SA, Biel/Bienne (CH)

( * ) Notice: Subject to any disclaimer, the term of this patent is extended or adjusted under 35 U.S.C. 154(b) by 0 days.

(21) Appl. No.: 16/847,809

(22) Filed: Apr. 14, 2020

(65) Prior Publication Data

US 2020/0356059 A1 Nov. 12, 2020

(30) Foreign Application Priority Data

May 8, 2019 (EP) .................................... 19173328

(51) Int. Cl.
  *G04B 37/08* (2006.01)
  *F16J 15/08* (2006.01)
(52) U.S. Cl.
  CPC .......... *G04B 37/08* (2013.01); *F16J 15/0806* (2013.01)
(58) Field of Classification Search
  CPC ...... G04B 37/08; G04B 37/11; G04B 47/066; G04B 19/283; G04B 37/081;
  (Continued)

(56) References Cited

U.S. PATENT DOCUMENTS 4,104,867 A 8/1978 Worsham
4,403,870 A * 9/1983 Thompson ......... G04B 37/0008
  368/280
(Continued)

FOREIGN PATENT DOCUMENTS

CH 217 284 A 10/1941
CH 234 391 A 9/1944
(Continued)

OTHER PUBLICATIONS

European Search Report dated Oct. 15, 2019 in European Application 19173328.6 filed on May 8, 2019 (with English Translation of Categories of Cited Documents), 5 pages.
(Continued)

*Primary Examiner* — Edwin A. Leon
(74) *Attorney, Agent, or Firm* — Oblon, McClelland, Maier & Neustadt, L.L.P.

(57) ABSTRACT

A water-resistant watch case of a diving watch, includes at least one back mounted on a lower side of a middle part, and a crystal mounted with a fastening gasket on an upper side of the middle part. The back includes an annular bearing surface for coming into contact with an inner annular surface of the middle part of a shape complementary to the bearing surface during mounting of the back on the middle part. The annular bearing surface and the inner annular surface are inclined towards the inside of the watch case at a determined angle less than 90° relative to a central axis perpendicular to a plane of the watch case so as to distribute stresses between the back and the middle part due to the water pressure during a dive. The annular bearing surface and the inner annular surface are conical in shape.

18 Claims, 2 Drawing Sheets

(58) Field of Classification Search
CPC .. G04B 37/225; G04B 39/00; G04B 37/0008; F16J 15/0806; G04C 10/00
USPC .......................................................... 368/291
See application file for complete search history.

(56) References Cited

U.S. PATENT DOCUMENTS

| | | | |
|---|---|---|---|
| 4,493,562 A | | 1/1985 | Gagnebin |
| 4,924,453 A | * | 5/1990 | Ray .................... G04B 37/0008 368/281 |
| 5,333,123 A | | 7/1994 | Plancon |
| 5,467,325 A | * | 11/1995 | Juillerat ................. G04B 37/11 368/276 |
| 8,777,480 B2 | * | 7/2014 | Silvant ................. G04B 19/286 368/295 |
| 9,170,565 B2 | * | 10/2015 | Kobayashi ............. G04B 37/05 |
| 10,073,418 B2 | | 9/2018 | Loetscher |
| 2014/0178625 A1 | | 6/2014 | Lauper et al. |

FOREIGN PATENT DOCUMENTS

| | | |
|---|---|---|
| CH | 378 792 A | 11/1963 |
| CH | 387 549 A | 10/1964 |
| CH | 516 188 A | 8/1971 |
| CH | 10 282/72 | 7/1976 |
| CH | 690 870 A5 | 2/2001 |
| EP | 0 091 683 A1 | 10/1983 |
| EP | 0 420 814 A1 | 4/1991 |
| EP | 0 327 829 B1 | 6/1992 |
| EP | 1 063 632 A1 | 12/2000 |
| EP | 2 182 416 A1 | 5/2010 |
| EP | 3 163 380 A1 | 5/2017 |
| GB | 1 153 764 A | 5/1969 |
| JP | 52-104964 A | 9/1977 |
| JP | 53-75160 U | 6/1978 |
| JP | 61-254884 A | 11/1986 |
| JP | 2014-121608 A | 7/2014 |
| JP | 2016-506264 A | 3/2016 |
| JP | 2016-70677 A | 5/2016 |
| WO | WO 2014/096260 A1 | 6/2014 |
| WO | WO 2016/146353 A1 | 9/2016 |

OTHER PUBLICATIONS

Office Action dated Feb. 2, 2021 in corresponding Japanese Patent Application No. 2020-077149 (with English Translation), 11 pages.
Combined Decision to Grant and Search Report dated Nov. 3, 2020 in Russian Patent Application No. 2020114857 (with English translation), 15 pages.
Combined Chinese Office Action and Search Report dated Apr. 8, 2021 in Chinese Patent Application No. 202010376854.5 (with English translation), 12 pages.

* cited by examiner

WATER-RESISTANT WATCH CASE

CROSS-REFERENCE TO RELATED APPLICATION

This application claims priority to European Patent Application No. 19173328.6 filed on May 8, 2019, the entire disclosure of which is hereby incorporated herein by reference.

TECHNICAL FIELD

The present invention relates to a water-resistant watch case in particular for a diving watch.

TECHNOLOGICAL BACKGROUND

To provide for the use of a mechanical or electronic watch underwater, the watch case, which comprises a horological movement or a time-based horological module, must be sealingly closed. For this purpose, the watch case comprises a back sealingly fastened to a first side of a middle part and a crystal fastened to a second opposite side of the middle part. Packings are provided for the assembly of the back, the middle part and the crystal of the watch. A watch function control or setting member is also sealingly mounted through the middle part of the case in the rest position.

Generally watch cases are not configured or assembled to withstand high water pressures, for example during a dive since the pressure inside the watch case is close to atmospheric pressure. Simple packings of traditional watches are not enough to guarantee a good water resistance of the case during a dive to very large depths underwater.

Mention may be made of patent application CH 690 870 A5 which describes a water-resistant watch case. The watch case consists of a crystal fastened on an upper side to a middle-bezel and a back fastened to the middle part by screwing it to an internal tapping of the middle part. The crystal is fastened to the middle part by an annular packing of a toroidal shape and bearing on a rim of the middle part. A packing is also provided between an outer rim of the back and a lower surface of the middle part. As the tapping can be damaged at high water pressure, a dome made of a resistant metal is also provided, bearing against an inner surface of the back and against an inner edge of the middle part. However, even with such a watch case arrangement, this does not allow guaranteeing a good water-resistance of the case during a dive to very large depths underwater, which constitutes a disadvantage.

Patent CH 372 606 describes a water-resistant watch case, which has a central portion or middle part surrounding a back and closed by a crystal. A threaded ring is bearing against an inclined outer surface of the back to retain it, and is screwed to a fastening portion connected to the middle part. With such an arrangement presented, this does not allow guaranteeing a good water-resistance of the case during a dive to very large depths underwater, which constitutes a disadvantage.

SUMMARY OF THE INVENTION

Therefore, the main purpose of the invention is to overcome the disadvantages of the prior art described above by proposing a water-resistant watch case adapted to withstand the high water pressure for diving to large depths under water.

To this end, the present invention relates to a water-resistant watch case, which comprises the features of the independent claim 1.

Particular embodiments of a water-resistant watch case are defined in the dependant claims 2 to 16.

An advantage of the water-resistant watch case lies in the fact that an annular bearing surface of the back inclined towards the inside of the watch case comes into contact with an inner annular surface of the middle part of a shape complementary to the annular bearing surface when mounting the back on the middle part. The bearing and inner surfaces are inclined towards the inside of the watch case at a determined angle less than 90° relative to a central axis perpendicular to a plane of the watch case. In the case of a generally cylindrical middle part, the bearing and inner surfaces are conical in shape. This allows having a good stress distribution between the back and the middle part due to the water pressure during a dive to large depths underwater.

An advantage of the water-resistant watch case lies in the fact that the crystal is fastened to the middle part by means of a gasket and with inclined contact surfaces of the middle part and the crystal. In the case of a generally cylindrical middle part, conical bearing surfaces are provided on the crystal and the middle part. In this way, pressure forces on the crystal are transmitted to the middle part via conical bearing surfaces.

BRIEF DESCRIPTION OF THE FIGURES

The purposes, advantages and features of a water-resistant watch case will appear better in the following description in a non-limiting manner with reference to the drawings wherein.

DETAILED DESCRIPTION OF THE INVENTION

In the following description, all the components of a case of a water-resistant watch, in particular a diving watch, which are well known to a person skilled in the art in this technical field are only stated in a simplified manner.

Figure 1A:
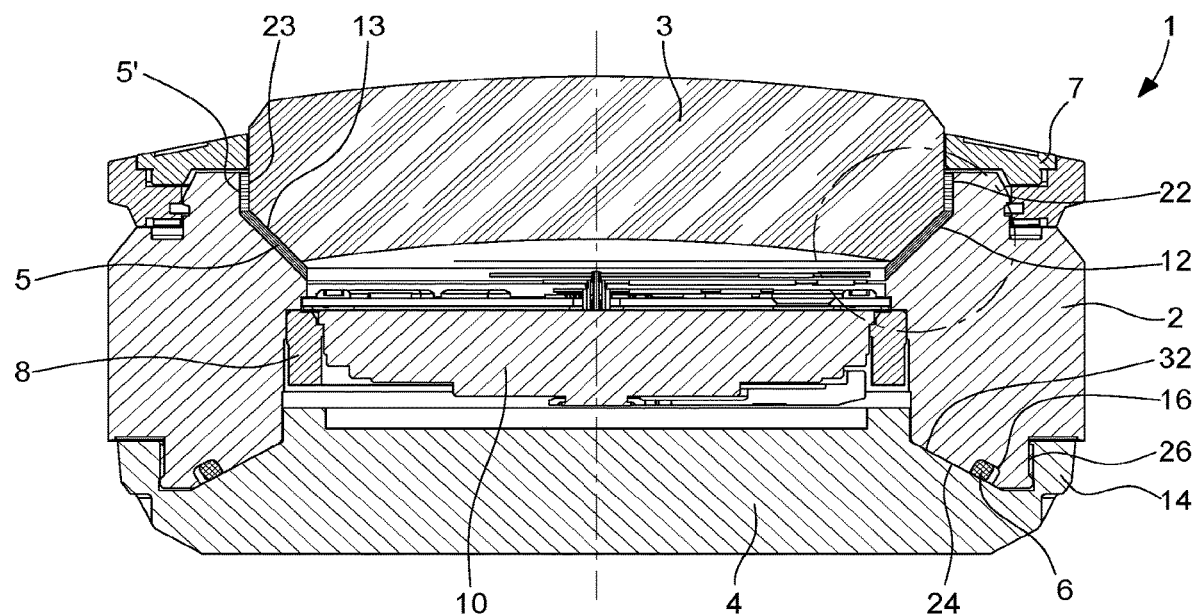
FIGS. 1a and 1b show in a simplified manner a cross-section of a first variant of a watch with a water-resistant case according to the invention, and a partial detail section of the fastening of the crystal to the middle part of the first variant according to the invention.
Figure 1B:
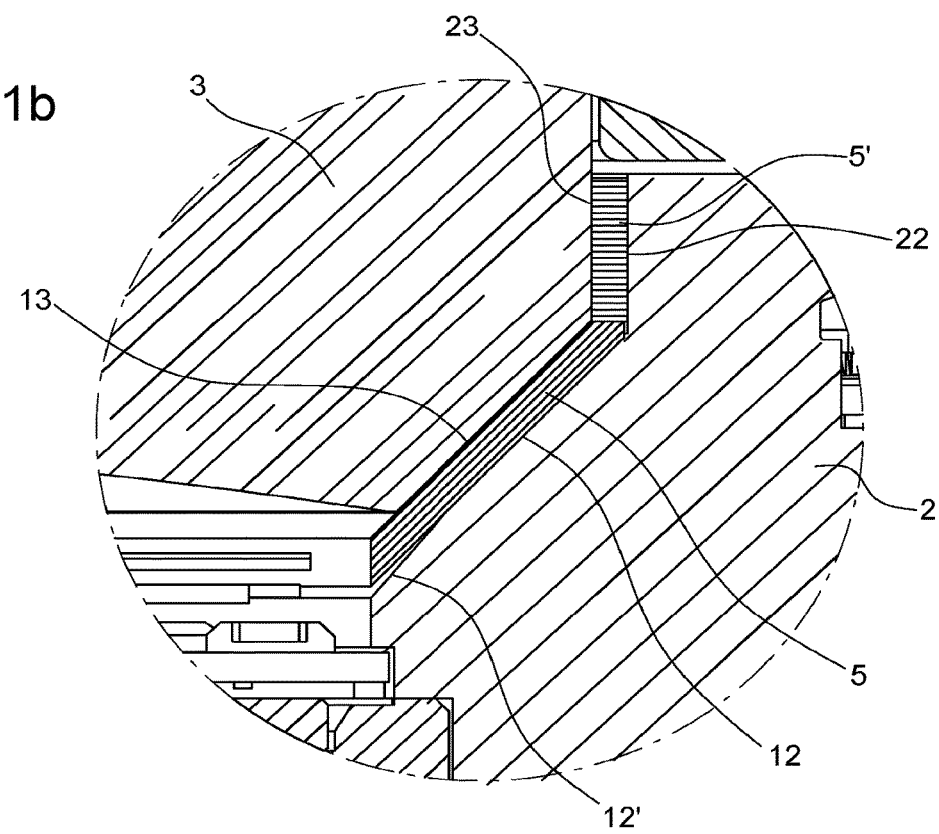

FIGS. 1a and 1b show a first variant of a watch case 1, which can be used for a diving watch. The watch case 1 essentially comprises a crystal 3, which can be made of sapphire or mineral crystal, fastened on an upper side of a middle part 2, and a back 4 mounted on a lower side of the middle part 2. A bezel 7 can also be mounted on the upper side of the middle part 2. A horological movement or module 10 is disposed in the watch case 1 in a casing circle 8, and at least one control member, not shown, can be sealingly mounted in a rest position on or through the middle part 2 for setting the time, the date or other functions of the diving watch.

According to the first variant, the back 4 comprises a fastening means, such as an annular rim 14 to be mounted on the lower side of the middle part 2. An annular bearing surface 24 of the back 4 comes into contact with an inner annular surface 32 of the middle part 2 of a shape complementary to the bearing surface 24 when mounting the back 4 on the middle part 2. The bearing 24 and inner 32 surfaces are inclined towards the inside of the watch case 1 at a determined angle less than 90° relative to a central axis perpendicular to a plane of the watch case 1.

In the case of a middle part 2 of a generally cylindrical shape, the surfaces 24, 32 are conical in shape and are inclined towards the inside of the watch case 1 at a determined angle less than 90° relative to a central axis of the watch case 1. This means that the top of each cone shape is in the direction of the inside of the watch case 1. The lower side of the middle part 2 also comprises an annular groove 16 housing a packing 6 of a toroidal shape (Butadiene Rubber Nitrile) in contact with the bearing surface 24 of the back 4 when the back 4 is mounted on the middle part. Preferably, the annular rim 14 of the back 4 comprises an internal tapping to be screwed onto a tapping 26 on the lower side of the middle part 2. For a middle part 2 and a solid back 4, made of a material, such as titanium, the angle can be of the order of 60°±5° relative to the central axis. This allows having a good stress distribution between the solid back 4 and the middle part 2 due to the water pressure during a dive to large depths underwater.

It should be noted that the back 4 can also be made of sapphire or mineral glass like crystal 3 to have a skeleton watch case 1 structure in order to view the inside of the diving watch.

The crystal 3 comprises an annular peripheral surface 13 to be mounted by means of at least one portion of a gasket 5, 5' of an annular shape on an inner annular surface 12 on the upper side of the middle part 2. The inner annular surface 12 is preferably of a shape complementary to the annular peripheral surface 13. The annular peripheral surface 13 of the crystal 3 is inclined at a defined angle less than 90° relative to an axis perpendicular to a plane of the watch case 1. Preferably, the inner annular surface 12 is inclined generally towards the inside of the watch case 1 at the same angle as the annular peripheral surface 13 relative to a central axis.

If the middle part 2 is of a generally cylindrical shape, the inner peripheral surface 13 and the inner annular surface 12 are conical in shape and inclined at a defined angle towards the inside of the watch case. This means that the top of each cone shape is in the direction of the inside of the watch case 1. The defined angle of inclination of the surfaces 12 and 13 can be of the order of 43°±5° relative to the central axis. This allows having a good stress distribution between the crystal 3 and the middle part 2 due to the water pressure during a dive to large depths underwater. The difference in water pressure compared to the pressure inside the watch case 1 tends to close any interstice between the surfaces 12, 13 in contact and the fastening gasket 5, 5' thanks to the inclination of the contact surfaces towards the inside of the watch case 1. This guarantees a good water-resistance and withstanding to high pressures.

In this first variant, the fastening gasket 5, 5' may preferably be composed of a first portion 5 made of amorphous metal or metallic glass or amorphous metal alloy and of a second portion 5' made of polymer (for example polyurethane) for retaining the crystal 3. The fastening gasket 5, 5' is of an annular shape for the hermetic closure of the crystal 3 on the middle part 2. For a middle part 2 of a generally cylindrical shape, the first portion 5 of the gasket is conical in shape, while the second portion 5' is linked on the upper rim of the first portion 5 and is cylindrical. Once the crystal 3 is fastened on the middle part 2, the first portion 5 bearingly links the inclined surfaces of the middle part 2 and of the crystal 3, while the second portion 5' is attached to an inner annular wall 22 of the middle part 2 and an outer annular wall 23 of the crystal 3 above the annular peripheral surface 13 of the crystal 3. Preferably, the second portion 5' stops at mid-height of the crystal 3 just below the bezel 7, while the first portion 5 of the gasket extends below the level of the link between the bottom of the crystal 3 and the middle part 2.

In a non-limiting manner, the length of the first portion 5 in cross-section can be of the order of 5 mm, while the height of the second portion of the gasket 5, 5' can be of the order of 2.5 mm. The thickness of the gasket can be of the order of 0.65 mm.

Normally, if the fastening gasket 5, 5' of annular shape is produced before the crystal 3 is fastened on the middle part 2, it is mainly the second portion 5' of the gasket which serves to hold the crystal 3 to the middle part 2, while the first portion 5 of the gasket is of the type carrying the crystal 3 on the middle part 2. However, it can also be imagined to have the two portions separated so as to allow the first portion 5 to be hot-fastened to the middle part 2 and to the crystal 3 before producing the second portion 5' of the gasket on the first portion 5 for retaining the crystal 3 by the outer annular wall 23 to the inner wall 22 of the middle part 2, which also guarantees good water-resistance.

When the watch case 1 is submerged underwater to large depths, this allows any space between the crystal 3 and the middle part 2 to be closed thanks to the inclined surfaces 12 and 13 of the crystal 3 and the middle part 2 and by means of the first metal portion 5 of the gasket. A good stress distribution is therefore achieved between the crystal 3 and the middle part 2 thanks to the first metal portion 5 of the gasket, which is made of amorphous metal or amorphous metal alloy.

It should also be noted that the inner annular surface 12 of the middle part 2 is inclined towards the inside of the watch case 1 and ends with a surface 12' curved inwards on approximately 3° after the inner annular surface 12. Thus, the first portion 5 of the gasket is no longer in direct contact with this curved surface 12'. On the other hand, when the water pressure increases substantially when diving, the first portion 5 of the gasket is pushed by the crystal 3 inwards to contact or conform to the curved surface 12'. Thus, this allows preventing the pressure of the inner corner of the crystal 3 from concentrating the stresses in the first portion 5 of the gasket, risking breaking it.

Several types of amorphous metal alloys can be used to make the first metal portion 5 of the gasket. In the most frequent cases, the amorphous metal alloy can be mainly composed of zirconium, which allows forming the gasket at a temperature higher than 350°, that is to say higher than the glass transition temperature of the alloy. The zirconium-based amorphous metal alloy can be composed of Zr(52.5%), Cu(17.6%), Ni(14.9%), Al(10%) and Ti(5%). The zirconium-based amorphous metal alloy may also comprise Zr(58.5%), Cu(15.6%), Ni(12.8%), Al(10.3%) and Nb(2.8%). The zirconium-based amorphous metal alloy may also comprise Zr(44%), Ti(11%), Cu(9.8%), Ni(10.2%) and Be(25%), or finally Zr(58%), Cu(22%), Fe(8%) and Al(12%). Preferably, to facilitate the production of such a gasket, the amorphous metal alloy can be mainly composed of platinum (Pt), which allows the gasket to be formed at a temperature above 230° C. The platinum-based amorphous metal alloy may comprise Pt(57.5%), Cu(14.7%), Ni(5.3%) and P(22.5%). It is also possible to provide for making the one-piece metal gasket 5, 5' of an amorphous metal alloy based mainly on palladium (Pd), which allows forming the gasket at a temperature above 300° C.

Other alloys of amorphous metals can also be mentioned. A titanium-based amorphous metal alloy may comprise Ti(41.5%), Zr(10%), Cu(35%), Pd(11%) and Sn(2.5%). A palladium-based amorphous metal alloy may comprise Pd(43%), Cu(27%), Ni(10%) and P(20%), or Pd(77%), Cu(6%) and Si(16.5%), or finally Pd(79%), Cu(6%), Si(10%) and P(5%). A nickel-based amorphous metal alloy may comprise Ni(53%), Nb(20%), Ti(10%), Zr(8%), Co(6%) and Cu(3%), or Ni(67%), Cr(6%), Fe(4%), Si(7%), C(0.25%) and B(15.75%), or finally Ni(60%), Pd(20%), P(17%) and B(3%). An iron-based amorphous metal alloy may comprise Fe(45%), Cr(20%), Mo(14%), C(15%) and B(6%), or Fe(56%), Co(7%), Ni(7%), Zr(8%), Nb(2%) and B(20%). A gold-based amorphous metal alloy may comprise Au(49%), Ag(5%), Pd(2.3%), Cu(26.9%) and Si(16.3%).

Figure 2A:
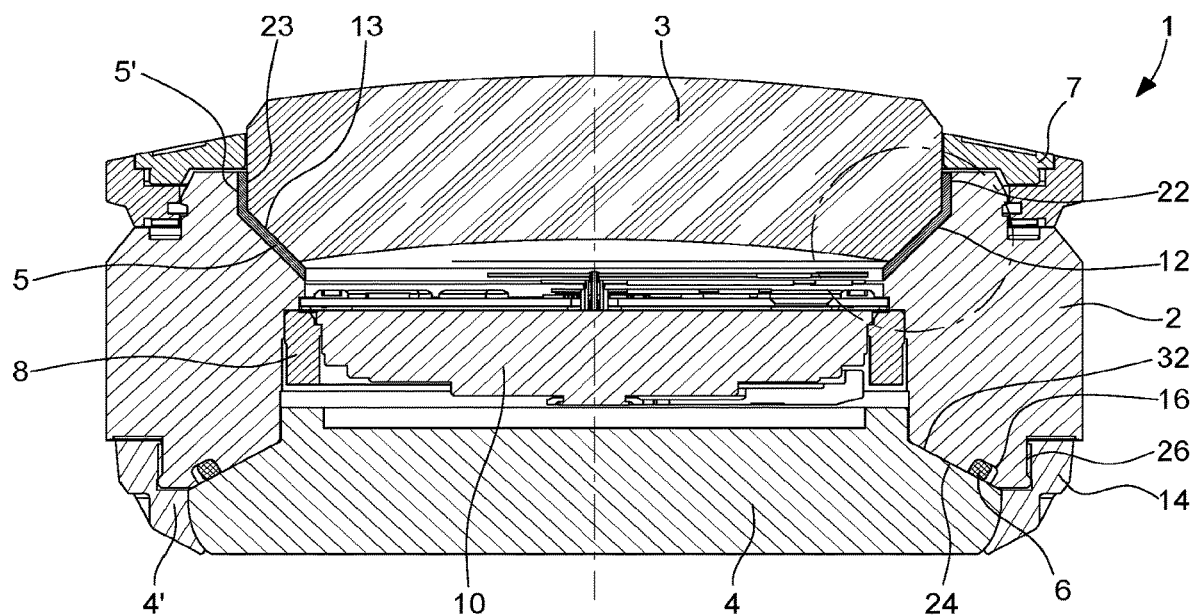
FIGS. 2a and 2b show in a simplified manner a cross-section of a second variant of a watch with a water-resistant case according to the invention, and a partial detail section of the fastening of the crystal to the middle part of the second variant according to the invention.
Figure 2B:
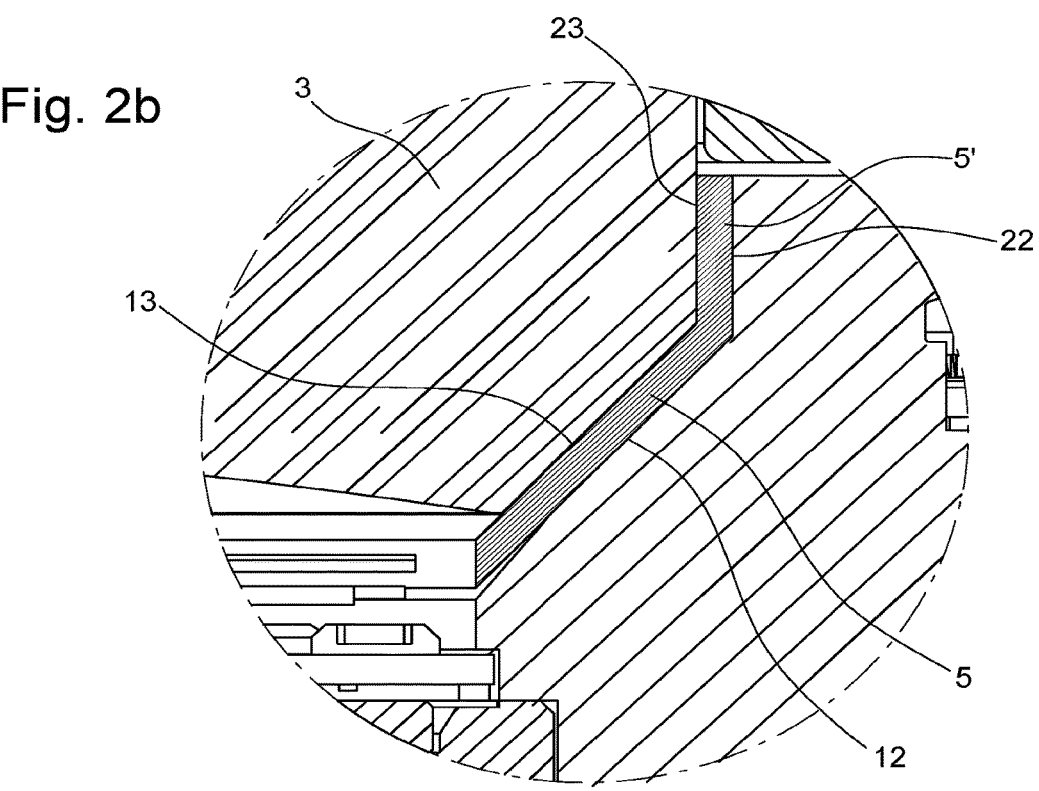

FIGS. 2a and 2b show a second variant of a watch case 1, which can be used for a diving watch. As most of the elements of this second variant are identical to the first variant explained with reference to FIGS. 1a and 1b, they will not be repeated. The differences are on the one hand at the fastening means of the back 4 on the lower side of the middle part 2 and at the metal gasket 5, 5' for fastening the crystal 3 to the middle part 2.

The solid back 4 is fastened to the middle part 2 by means of a ring 4' as a fastening means. This ring 4' is provided with an inner bearing surface coming into contact with a peripheral outer surface of the back 4, which is preferably of complementary shape. The inner bearing surface of the ring 4' is curved or inclined towards the centre of the back 4. The ring 4' further comprises an annular rim 14 having an internal tapping to be screwed onto a tapping 26 on the lower side of the middle part 2 during mounting of the back 4, bearing on the inner bearing surface of the ring 4', on the middle part 2. The ring 4 can be of the same material as the back 4 or of another metallic material.

In the case of a middle part of generally cylindrical shape, the fastening gasket 5, 5' of annular shape is entirely composed of amorphous metal or metallic glass or amorphous metallic alloy. It comprises a first portion 5 of the conical gasket, and a second cylindrical portion 5' linked on the upper rim of the first portion 5 to form one single piece. The general shape of the fastening gasket 5, 5' is identical to that of FIGS. 1a and 1b, and the same applies for the angle of inclination of the surfaces 12, 13. Preferably, the crystal 3 is hot-fastened to the middle part 2 by the gasket 5, 5' made of amorphous metal.

For information purposes, the production of such a gasket 5, 5' made of amorphous metal can be done by different shaping methods either:
- directly from the molten metal such as, for example, pressure injection, gravitational casting, centrifugal casting, anti-gravitational casting, suction casting, additive powder manufacturing
- from amorphous preforms by hot deformation above the glass transition temperature such as for example, electromagnetic forming, forming by capacitive discharge, forming under gas pressure, mechanical forming. The objective of this step is to obtain a preform having the correct dimensions and having enough proportion of amorphous phase to allow its deformation during the assembly step described below.

It should also be noted that with the fastening of the crystal 3 on the middle part 2 of the variant embodiments described above and with the contact of conical surfaces between the crystal 3 and the middle part, a good water-resistance and a good stress distribution between the crystal 3 and the middle part 2 are guaranteed. The same applies with the contact of the conical surfaces of the back 4 and the middle part 2. This is necessary since the watch is a diving watch which must withstand high stresses due to the pressure difference between the inside of the watch and the water pressure in large depth underwater. As the contact surfaces between the middle part 2, the gasket 5, 5' and the crystal 3, or between the middle part 2 and the back 4 are quite large with these conical shapes, there is a better transmission of stresses over a larger area. This is important to guarantee the water-resistance of the watch when diving deep underwater. With these arrangements, the water pressure on the watch case 1 tends to close any interstice between the contact surfaces. In addition, this prevents the extrusion of the fastening gasket 5, 5'.

From the description which has just been made, several alternative embodiments of the watch case can be designed by a person skilled in the art without departing from the scope of the invention defined by the claims. The watch case by its middle part may have a general shape different from a cylinder.

What is claimed is:

1. A water-resistant watch case for a diving watch, the case comprising:
    a middle part;
    at least one back mounted on a lower side of the middle part;
    a crystal; and
    a fastening gasket for mounting the crystal on an upper side of the middle part,
    wherein the back comprises an annular bearing surface for coming into contact with an inner annular surface of the middle part of a shape complementary to the bearing surface when mounting the back on the middle part, and a top of each cone shape is in a direction of an inside of the watch case,
    wherein the annular bearing surface and the inner annular surface are inclined towards the inside of the watch case at a determined angle less than 90° relative to a plane of the back and to a central axis perpendicular to a plane of the watch case so as to distribute stresses between the back and the middle part due to a water pressure during a diving, and
    wherein the crystal comprises an annular peripheral surface of a conical shape to be mounted by means of at least one first portion of the fastening gasket on an inner annular surface of a shape complementary to the upper side of the middle part, wherein the annular peripheral surface of the crystal is inclined towards the inside of the watch case at a defined angle less than 90° relative to a surface plane of the crystal and to a central axis perpendicular to a plane of the watch case,
    wherein a second portion of the fastening gasket is in contact between an inner annular wall of cylindrical shape of the middle part above the inner annular surface and an outer annular wall of cylindrical shape of the crystal above the annular peripheral surface so as to distribute stresses between the crystal and the middle part due to the water pressure during a dive.

2. The watch case according to claim 1, wherein the annular bearing surface of the back and the inner annular surface of the middle part are conical in shape.

3. The watch case according to claim 1, wherein the determined angle of inclination of the bearing and inner surfaces is of the order of 60°±5° relative to the central axis.

4. The watch case according to claim 2, wherein at the determined angle of inclination of the bearing and inner surfaces is of the order of 60°±5° relative to the central axis.

5. The watch case according to claim 1, wherein the lower side of the middle part further comprises an annular groove housing a packing in contact of the bearing surface during the mounting of the back on the middle part.

6. The watch case according to claim 2, wherein the lower side of the middle part further comprises an annular groove housing a packing in contact of the bearing surface during the mounting of the back on the middle part.

7. The watch case according to claim 5, wherein the back comprises an annular rim having an internal tapping to be screwed onto a tapping on the lower side of the middle part during the mounting of the back on the middle part.

8. The watch case according to claim 5, wherein a ring is provided for mounting the back to the middle part, wherein the ring is provided with an inner bearing surface coming into contact with a peripheral outer surface of the back, which is of complementary shape, and wherein the ring comprises an annular rim having an internal tapping to be screwed onto a tapping on the lower side of the middle part.

9. The watch case according to claim 8, wherein the first portion of the fastening gasket between the annular peripheral surface and the inner annular surface is made of amorphous metal or of amorphous metal alloy.

10. The watch case according to claim 1, wherein the annular walls are parallel to the central axis.

11. The watch case according to claim 1, wherein the first portion of the fastening gasket is made of amorphous metal or of amorphous metal alloy, and wherein the second portion of the fastening gasket is made of polyurethane to fasten the crystal to the middle part.

12. The watch case according to claim 9, wherein the amorphous metal alloy of at least one portion of the fastening gasket is based mainly on zirconium.

13. The watch case according to claim 11, wherein the amorphous metal alloy of at least one portion of the fastening gasket is based mainly on zirconium.

14. The watch case according to claim 9, wherein the amorphous metal alloy of at least one portion of the fastening gasket is based mainly on platinum.

15. The watch case according to claim 11, wherein the amorphous metal alloy of at least one portion of the fastening gasket is based mainly on platinum.

16. The watch case according to claim 9, wherein the amorphous metal alloy of at least one portion of the fastening gasket is based mainly on palladium.

17. The watch case according to claim 11, wherein the amorphous metal alloy of at least one portion of the fastening gasket is based mainly on palladium.

18. The watch case according to claim 1, wherein the defined angle of inclination of the annular peripheral surface of the crystal and of the inner annular surface of the middle part is of the order of 43°+5° relative to the central axis.

* * * * *